United States Patent [19]
Smowton

[11] Patent Number: 5,380,049
[45] Date of Patent: Jan. 10, 1995

[54] PIPE COUPLING

[75] Inventor: Mark Smowton, South Woodham Ferrers, Gabon

[73] Assignee: Ford Motor Company, Dearborn, Mich.

[21] Appl. No.: 930,536

[22] Filed: Aug. 19, 1992

[30] Foreign Application Priority Data

Jun. 27, 1990 [GB] United Kingdom ............... 9014248

[51] Int. Cl.6 ............................................. F16L 37/12
[52] U.S. Cl. .................................. 285/169; 285/924; 285/351; 285/921; 285/319
[58] Field of Search ............... 285/169, 319, 921, 351, 285/903, 113

[56] References Cited

U.S. PATENT DOCUMENTS

| | | | |
|---|---|---|---|
| 2,148,566 | 2/1939 | Leon | 285/169 |
| 2,985,469 | 5/1961 | Bowman, Jr. | 285/260 |
| 3,718,350 | 2/1973 | Klein | 285/924 |
| 3,929,357 | 12/1975 | DeVincent et al. | 281/924 |
| 4,035,005 | 7/1977 | DeVincent et al. | 285/924 |
| 4,191,408 | 3/1980 | Acker | 285/113 |
| 4,483,510 | 11/1984 | Palau et al. | 285/924 |
| 4,580,816 | 4/1986 | Campbell | 285/921 |
| 4,707,000 | 11/1987 | Torgardh | 285/924 |
| 4,836,584 | 6/1989 | Baker | 285/351 |
| 4,842,309 | 6/1989 | LaVene et al. | 285/319 |
| 4,850,622 | 7/1989 | Suzuki | 285/351 |
| 4,904,002 | 2/1990 | Sasa et al. | 285/903 |
| 4,946,204 | 8/1990 | Boticki | 285/921 |
| 5,078,430 | 1/1992 | St. Onge | 285/921 |

FOREIGN PATENT DOCUMENTS

| | | | |
|---|---|---|---|
| 2291438 | 6/1976 | France | 285/924 |
| 1520742 | 2/1991 | United Kingdom . | |

*Primary Examiner*—Eric K. Nicholson
*Attorney, Agent, or Firm*—Raymond L. Coppiellie; Roger L. May

[57] ABSTRACT

A quick fit pipe coupling has two parts with each body part retaining one of the pipes to be connected. The two body parts are screwed together. One pipe is to be push-fitted into the coupling. This pipe has radially extending ridges by which the pipe can be latched in one part of the coupling, and this one part of the coupling also carries the seals which provide the fluid tight seal. When the coupling is dismantled, the seals remain in position and are not disturbed.

11 Claims, 4 Drawing Sheets

PIPE COUPLING

FIELD OF THE INVENTION

This invention relates to a pipe coupling in which one pipe is coupled and sealed to another pipe by means of a push-in action, and where the two pipes can be separated from and reconnected to each other.

BACKGROUND TO THE INVENTION

An example of a coupling of this type is shown in British patent 1 520 742. The coupling described in this patent includes metal teeth which grip into the smooth surface of a pipe and normally resist pull-out forces tending to separate the pipes. However in this coupling the metal teeth damage the pipes surface on assembly and this can lead to a reduction in sealing performance.

Another example of this type of coupling is shown in U.S. Pat. No. 4,191,408. In this specification, a shaped tube end is pushed into a socket where it is latched in place by a snap-fit action and engages with a seal ring to form a seal. However in this case, the tube end makes a seal with the seal ring before the snap action takes place to latch the tube in the socket. As a result, it is possible for the seal to be only partly assembled, i.e. to be sealed but not latched. Pressure testing may not reveal that latching of the components has not taken place, and the two components may separate and leak at a later stage in the life of an assembly. This is a particular problem in respect of fluid lines on motor vehicles which are subjected to vibration during service. In this coupling, on disassembly the seal will remain in position on the tube and the outer circumference will be unrestrained. Because such seals tend to swell during use, reassembly can then cause a problem.

SUMMARY OF THE INVENTION

According to the present invention, there is provided a pipe coupling having a body with a first body part for connection to a first pipe, a second body part forming a socket for receiving a second pipe in a push-in manner, and a through bore for the passage of fluids between the first and second pipes, the second body part including a seal and latching means to cooperate with radially extending ridges on the second pipe, the seal and the latching means being arranged relative to one another so that as the second pipe is pushed into the socket, latching occurs before sealing occurs, and wherein the second body part is detachable from the first body part, and the seal remains with the second body part when this is detached from the first body part.

The use of latching means which cooperate with radially extending ridges on the second pipe avoids any necessity for the latching to damage the surface of the tube and therefore the seals can seal against an as-manufactured surface of the pipe.

Because the seal remains in position between the second part and the second pipe on disassembly, it cannot be damaged on disassembly and reassembly. Moreover if the seal swells during use, this will not adversely affect the reassembly of the coupling.

Both the first and second body parts are preferably moulded from plastics materials. The latching means on the second body part may be provided by integrally-formed, internally-directed ribs which will allow the second pipe to be pushed in with the ribs yielding to allow the ridges to pass, but will prevent the second pipe from being pulled out.

The seal may be formed by two O-rings seated in an annular recess in the second body part.

The connection between the first and second body parts may be made by a thread. The thread itself may form a seal between the two parts or alternatively the thread may be used to force sealing faces on the two body parts into sealing contact with one another.

The first and second body parts may each have an external hexagonal form so that they can be gripped by a spanner to separate the two parts.

BRIEF DESCRIPTION OF THE DRAWINGS

The invention will now be further described, by way of example, with reference to the accompanying drawings, in which.

DESCRIPTION OF PREFERRED EMBODIMENTS

Figure 1:
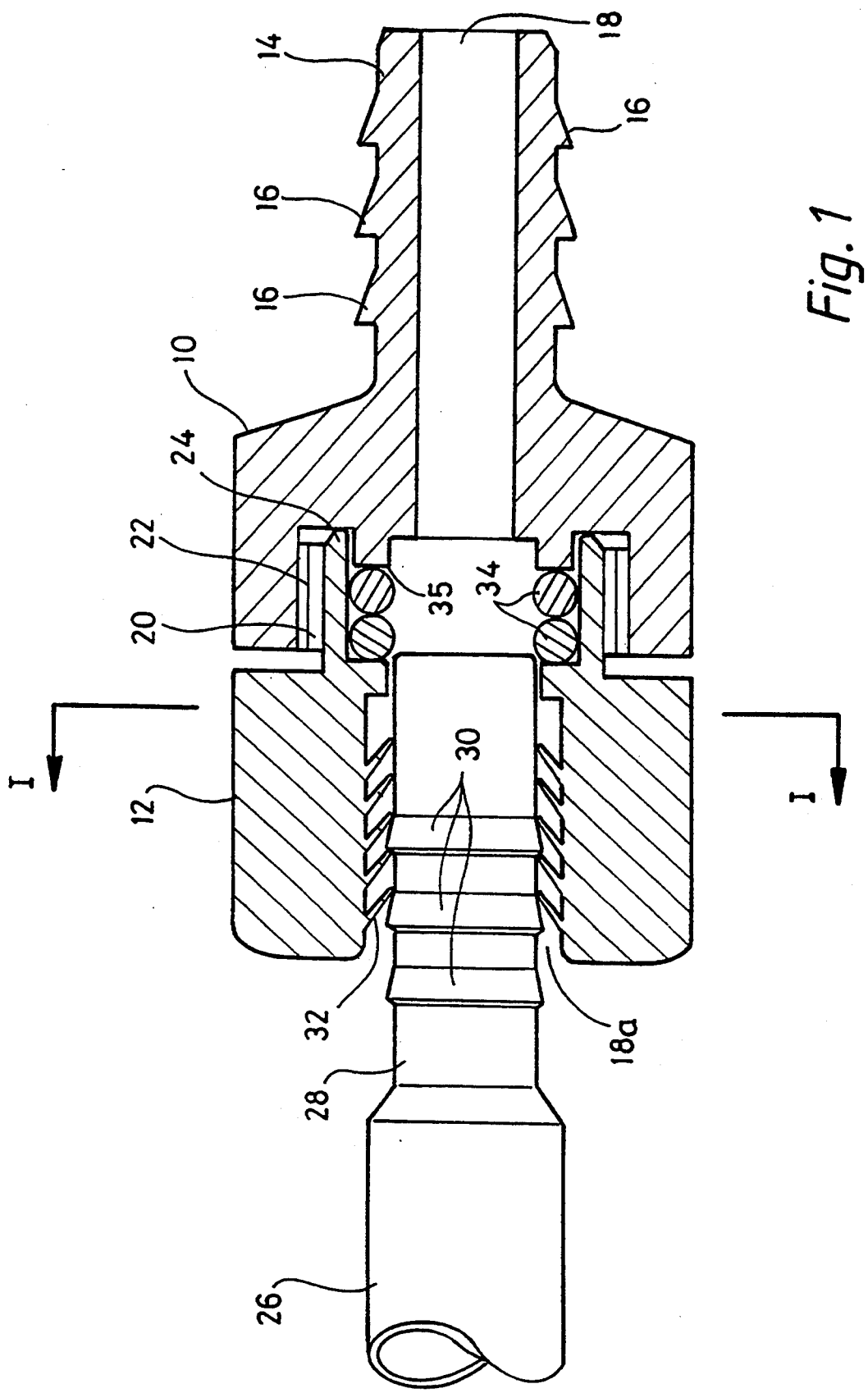
FIG. 1 is a cross sectional view through a first embodiment of coupling in accordance with the invention.

FIG. 1 shows a pipe coupling which has a first body part 10 and a second body part 12. The body part 10 has a spigot 14 with barbed rings 16 arranged so that a flexible pipe or hose can be pushed onto the spigot and retained there in the manner illustrated in FIG. 2. The second body part 10 also has a through bore 18 so that fluid can flow through the coupling.

The second body part 12 has an external thread at 20 which mates with a corresponding internal thread 22 on the first body part so that the two parts can be screwed together. When the two parts are screwed together, a lip 24 on the second part seals against a corresponding sealing face on the first part. The second part 12 also has a through bore 18a which registers with the bore 18.

The bore 18a forms a socket into which a second pipe 26 can be inserted. The pipe 26 has a reduced diameter end 28 on which three radially extending ridges 30 are formed. The interior of the passage 18a has resilient lips 32 which cooperate with the ribs 30 so that the pipe 26 can be pushed into the bore past the lips 32, but cannot be pulled out of the bore.

Figure 2:
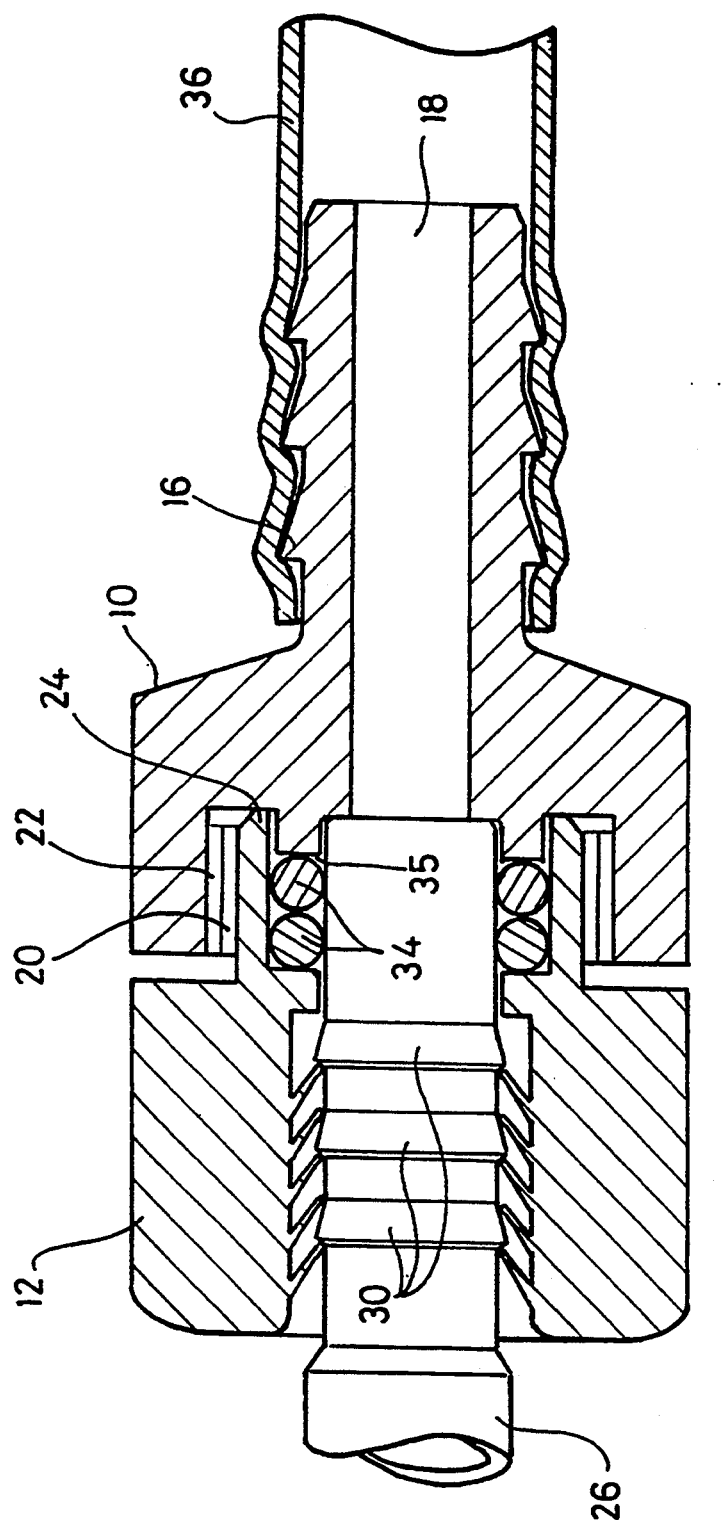
FIG. 2 shows the coupling of FIG. 1 after full assembly.

In FIG. 1, the pipe 26 is shown in a position where the pipe is retained in the coupling by the lips 32 and the ridges 30, but no seal has yet been made. FIG. 2 shows the next stage of assembly of the coupling where the pipe 26 has been pushed fully home and where the leading cylindrical part of the pipe is sealed by O-rings 34 to walls of the second body part 12. Sealing contact is also established between one of the O-rings 34 and an end wall 35 of the first body part 10. In this position the fluid path between the pipe 26 and the flexible pipe 36 is established.

It is important that the coupling should be configured so that the push-in pipe 26 is first gripped and retained in the coupling and then sealed. In this way the coupling can never be assembled without the pipe being properly retained. If the pipe is only partially pushed in such that the latching is effective but the seal is not made, then a leak will become immediately apparent on testing the joint.

The fact that the end 28 of the pipe 26 is reduced in diameter is also an important feature. In the application of this invention to fuel lines where conventional 8 mm diameter piping is used, it is impossible to mistakenly connect an unformed 8 mm diameter pipe (i.e. without ridges 30) in the coupling because the pipe will not fit into the passage 18a.

The coupling has only four components; the body parts 10 and 12 and two O-rings 34. If either of the components 10 or 12 is missing, this will be immediately apparent. If either of the O-rings is missing, the assembled coupling will fail when its fluid-tightness is tested.

Figure 3:
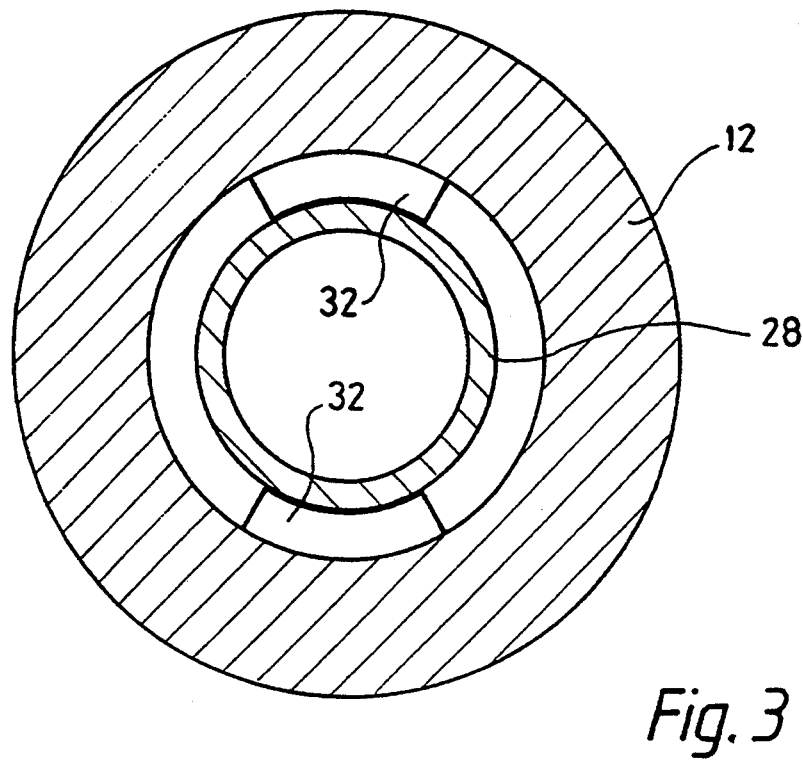
FIG. 3 is a cross section through the coupling of FIG. 1 on the lines I—I.

FIG. 3 shows how the ribs 32 are formed around part only of the internal circumference of the body part 12.

Figure 4:
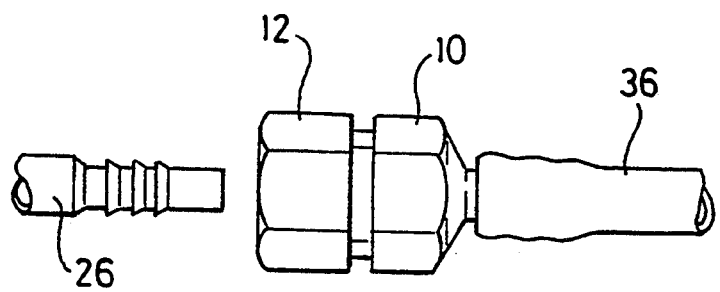
FIGS. 4, 5 and 6 are external views showing different stages in the assembly and disassembly of the coupling.
Figure 5:
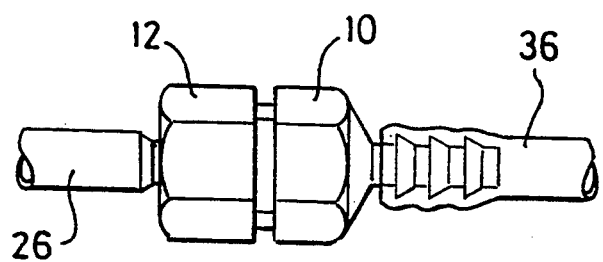
Figure 6:
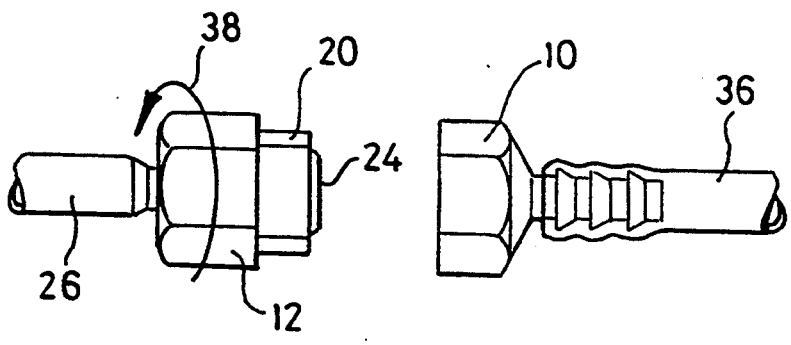

FIG. 4 shows the arrangement of the coupling in the way in which it is presented for assembly. The coupling will be fitted on the end of a flexible pipe or hose 36, and the second pipe 26 is presented to and pushed into the socket on the left hand side of the coupling. The coupling then takes up the position shown in FIG. 5 where the two pipes 26 and 36 are connected and sealed.

In order to separate the two pipes, as may be required during servicing of a vehicle on which they are used, the body part 12 is rotated in the direction of the arrow 38 by applying a spanner to the hexagonal outer face of the body part. This causes the two body parts to separate by unscrewing of the threads 20 and 22. The O-ring seals 34 will remain in the second body part 12. The parts can then be reconnected by reversing this procedure. The body part 12 can rotate relative to the pipe 26 during this unscrewing and screwing up movement.

Figure 7:
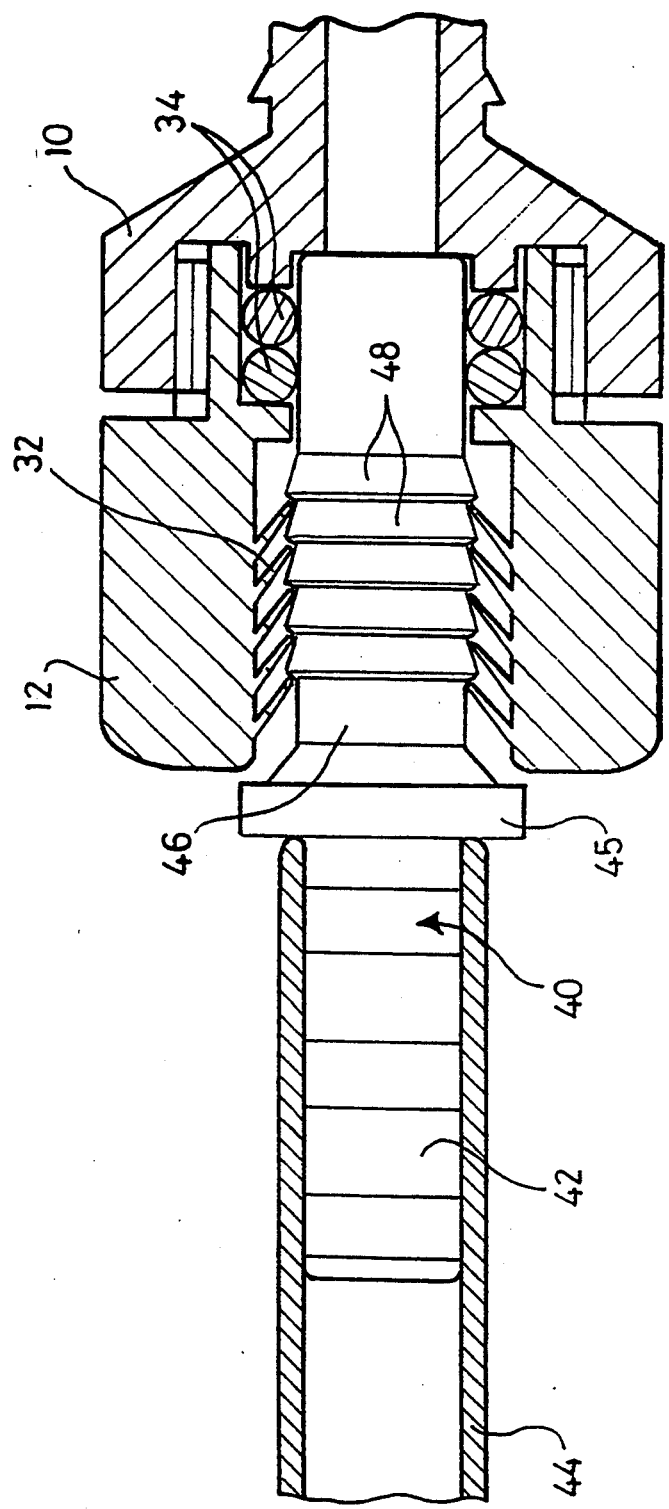
FIG. 7 is a cross section through a second embodiment of coupling in accordance with the invention.
Figure 8:
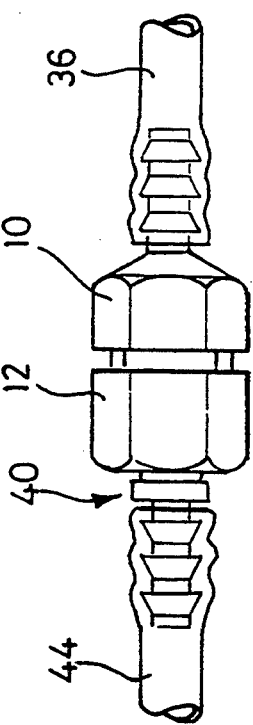
FIG. 8 is an external view of the coupling of FIG. 7.

An alternative embodiment shown in FIG. 7 is used to connect two flexible pipes. A separate connector piece 40 has a shank 42 which pushes inside a hose 44 up to a collar 45 and is retained there by a barbed ring formation. The connector also has a spigot 46 with radially extending ridges 48 which cooperate with the ribs 32 and the seals 34 in the second body part 12. In this way, the connector piece 40 forms a rigid end to the hose 44 which allows it to be connected to the pipe 36 (see FIG. 8) by means of the coupling 10, 12.

Because the O-rings remain within the second part and are substantially hidden, they will not be damaged by disassembly of the coupling. The coupling can be separated by use of normal readily available tools, and the manner of disassembly is likely to be clearly apparent to a mechanic working on a vehicle on which the coupling is used. The coupling fulfils the requirements that it should latch before it seals, and the latching is accomplished by use of a minimum number of component parts.

The ridges 30 on the pipe 26 can be formed by a known upsetting/swaging technique, and assembly of the pipe 26 to the coupling will not cause any damage to the sealing surface of the pipe which mates with the O-rings 34.

I claim:

1. A pipe coupling assembly, comprising:
   a first and second pipe, said second pipe having a plurality of radially extending ridges at one end thereof;
   a first and second body part, said first body part having a first end for connection to said first pipe and a second end for connection to said second body part;
   said second body part having a first end for connection to said first body part and a second end forming a socket for receiving said second pipe therein, in a push-in manner;
   said first and second body parts having a through bore for the passage of fluid between said first and second pipes;
   said first and second body parts molded from plastics materials;
   said second body part further comprising a sealing means and latching means for cooperating with said radially extending ridges on said second pipe, said latching means on said second body part comprising integrally-formed, internally-directed ribs which allow said second pipe to be pushed into said socket with said ribs yielding to allow said ridges to pass, but which prevent said second pipe from being pulled out, and said sealing means between said second body part and said second pipe comprising two O-rings seated in an annular recess on said second body part, said sealing means and latching means being arranged relative to one another so that as said second pipe is pushed into said socket, latching occurs between said second body part and said second pipe before sealing occurs between said second body part and said second pipe;
   and wherein said second body part is connected with and detachable from the first body part, such that said sealing means remains with said second body part when said second body part is detached from said first body part.

2. A pipe coupling as claimed in claim 1, wherein the connection between the first and second body parts is made by a thread.

3. A pipe coupling as claimed in claim 2, wherein the thread itself forms a seal between the two body parts.

4. A pipe coupling as claimed in claim 2, wherein the thread is used to force sealing faces on the two body parts into sealing contact with one another.

5. A pipe coupling as claimed in claim 1, wherein the first and second body parts each have an external hexagonal form so that they can be gripped by a spanner to separate the two parts.

6. A pipe coupling as claimed in claim 1, wherein the seal is formed by two O-rings seated in an annular recess in the second body part.

7. A pipe coupling as claimed in claim 1, wherein the connection between the first and second body parts is made by a thread.

8. A pipe coupling as claimed in claim 1, wherein the first and second body parts each have an external hexagonal form so that they can be gripped by a spanner to separate the two parts.

9. A pipe coupling as claimed in claim 1, wherein the first and second body parts each have an external hexagonal form so that they can be gripped by a spanner to separate the two parts.

10. A pipe coupling as claimed in claim 2, wherein the first and second body parts each have an external hexagonal form so that they can be gripped by a spanner to separate the two parts.

11. A pipe coupling as claimed in claim 5, wherein the first and second body parts each have an external hexagonal form so that they can be gripped by a spanner to separate the two parts.

* * * * *